(12) United States Patent
Stumbo et al.

(10) Patent No.: US 7,483,179 B2
(45) Date of Patent: Jan. 27, 2009

(54) METHOD AND SYSTEM FOR SENDING MATERIAL

(75) Inventors: William Kenneth Stumbo, Fairport, NY (US); Nathaniel G. Martin, Rochester, NY (US); David Tilley, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 753 days.

(21) Appl. No.: 11/116,712

(22) Filed: Apr. 28, 2005

(65) Prior Publication Data
US 2006/0245003 A1 Nov. 2, 2006

(51) Int. Cl.
*B41B 19/00* (2006.01)

(52) U.S. Cl. ...................................... 358/402

(58) Field of Classification Search ................ 358/402, 358/400; 705/9, 8, 7, 1
See application file for complete search history.

(56) References Cited

U.S. PATENT DOCUMENTS

| | | | |
|---|---|---|---|
| 6,396,951 B1 | 5/2002 | Grefenstette | |
| 6,704,456 B1 | 3/2004 | Venable | |
| 6,722,574 B2 | 4/2004 | Skante et al. | |
| 6,738,154 B1 | 5/2004 | Venable | |
| 6,744,536 B2 | 6/2004 | Buchar et al. | |
| 6,799,719 B2 | 10/2004 | Peng | |
| 2002/0007301 A1* | 1/2002 | Reuning | 705/9 |
| 2003/0020959 A1* | 1/2003 | Henry | 358/402 |
| 2003/0063097 A1 | 4/2003 | Prabhakar et al. | |
| 2003/0161534 A1 | 8/2003 | Loce et al. | |
| 2004/0096102 A1 | 5/2004 | Handley | |
| 2004/0169873 A1 | 9/2004 | Nagarajan | |
| 2004/0234311 A1 | 11/2004 | Adams | |

OTHER PUBLICATIONS

U.S. Appl. No. 10/970,930, filed Oct. 22, 2004 entitled "System and Method for Identifying and Labeling Fields of Text Associated With Scanned Business Documents".

Heather Newman, "Heather Newman: Business card scanners keep contacts organized", Detroit Free Press, www.freep.com/money/tech/newman12_20031112.htm, Mar. 22, 2005.

* cited by examiner

*Primary Examiner*—Mark K Zimmerman
*Assistant Examiner*—James A Bonner, Jr.
(74) *Attorney, Agent, or Firm*—Pepper Hamilton LLP

(57) ABSTRACT

A method for distributing a document by email. The method includes scanning a business document, extracting an email address from the business document, scanning a document and automatically emailing the scanned document to the email address extracted from the business document.

14 Claims, 2 Drawing Sheets

METHOD AND SYSTEM FOR SENDING MATERIAL

BACKGROUND

1. Technical Field

The disclosed embodiments generally relate to methods and systems for sending material to a recipient. More particularly, the disclosed embodiments relate to methods and systems for sending scanned material to an email address extracted from a business card.

2. Description of Related Art

Businesses today operate in fast-paced environments where the transfer of information is continuously occurring. Commonly, the fastest and most cost-effective mode of data transfer is via email. Often documents are scanned and emailed to an appropriate third party who can have the information at their disposal in a matter of minutes or even seconds.

This transfer of information in the office is facilitated by networks of computers and so-called multifunction devices. These multifunction devices incorporate printers, faxes and scanners that, coupled with servers running the proper software, create functionality to convert paper documents to electronic form and vice-versa. These devices also are instrumental in the transfer of information from one individual to another. Furthermore, these networked devices are able to connect personal digital assistants, cell phones and other hand-held devices. It is therefore important and valuable to extract business information in a networked environment to store, display and transfer the information where it is most useful.

One example of a simple source of information is business cards. Business cards are used universally by people to identify themselves and provide contact information to other people. Exchanging business cards is a traditional business practice for people to convey important information. The printed information on a business card may include a combination of identification and/or contact information; such as name, address, phone number, and/or email address; and non-important business information; such as logos, graphics, annotations, and/or slogans. Notwithstanding the fact that the cards contain both types of information, a business card is still considered a critical vehicle to conveying the information needed in establishing and/or maintaining business relationships.

With the advent of digital devices such as personal digital assistants, electronic address books, or personal computers, the conversion of the printed information on the business card to an electronic format has become a necessary business tool. The conventional tools of a scanned business card recognition system, often used to import the printed information to digital devices, are labor-intensive and prone to error.

Electronic business card readers are also utilized to convert the printed information on the business card to an electronic format. Examples of electronic business card readers include those commercially available from companies such as Card-Scan and IRIS. Other multifunction scanners, such as the Xerox Visioneer DocuMate™ scanner series, include business card scanning as one of many possible features. These card readers or scanners also include associated software which interprets the information from the business card. In conventional scanned business card recognition systems, once the printed text on a business card has been recognized by optical character recognition software, the text gets labeled according to one or more functions, for example, email address, name, organization, postal address, etc. Business card fields are often labeled using lexicographical information where text comprising names is identified using a dictionary and text comprising organizations is identified using a dictionary of organizations. However, electronic business card readers alone focus on capturing information from business cards and merely integrating the information into contact management software, such as Microsoft Outlook, and they do not integrate with document management and delivery software. Additionally, these systems do not integrate with multifunction devices.

One of the critical pieces of information obtained from the business card is an individual's contact information, for example, their email address. Accordingly, the possession of an email address allows the transfer of information to occur electronically with the information being transferred by sending it directly to a recipient's email address. In this process, the information typically needs to be scanned into a document which can then be forwarded as an attachment in an email.

Common methods of forwarding information via email include inputting a recipient's email address into a multifunction device prior to being able to send an email. An example of this process includes the use of a Xerox Corporation product, CenterWare® document management software. In this process, servers are utilized as a repository for templates that email documents. Another method of transferring information uses the Xerox product, FlowPort®. FlowPort requires that a coversheet be constructed at a FlowPort® website, printed and then used as a coversheet at a scanning device. Central in these and other current methods for sending documents via email is that some form of "set-up" must occur prior to being able to send an email, for example, entering an email address or completing a coversheet. Thus, a user is required to perform an "inputting" type activity where an email address needs to be entered or selected prior to emailing or transferring a document.

An example of emailing a business card of the prior art is disclosed in U.S. Pat. No. 6,722,574 to Skantze et al. This disclosure describes a business card where the information on the business card can be transferred to the recipient in digital format. Information is transmitted using a position-coding pattern, which is printed on the front and/or back of the business card. The business card holder's particulars are sent in a .vcf file, and an email may be put together with the business card holder's particulars and be sent to the business card recipient. However this disclosure merely discloses emailing the information on a business card to the business card holder for contact information management. This disclosure does not disclose the ability to email a document directly to the email address extracted from the business card particular, nor does it disclose being able to do so without entering the recipient's email address.

Accordingly, a need exists for an improved method and system for transferring information to a recipient, whereby the recipient's contact information can be electronically extracted from a business document such as a business card, and the information transferred to the extracted email address.

SUMMARY

An embodiment includes a method for distributing a document by email. Initially, a business document is scanned. An email address is then extracted from the business document. A document is scanned and automatically emailed to the email address extracted from the business document. The method may further include a step of inserting the business document in a scanner to initiate scanning of the business document.

The method may further include removing the business document from a scanner to initiate emailing of the scanned document.

The email address may be extracted from the business document utilizing optical character recognition technology to obtain the email address. Multiple business documents may be scanned to form a distribution list which includes a plurality of email addresses. A scanned document may then be distributed to the email addresses in the distribution list. In the embodiment described herein, a user may not be required to input an email address. The scanned document may be emailed from a multifunctional device to the email address extracted from the business document. A business document may be scanned in a scanner in communication with the multifunction device. The business document may include a business card, a resume, an application form, or any document containing contact information.

Another embodiment includes a system for transferring information. The system includes at least one scanner, a processor, a storage medium and a communication interface. The storage medium may be in communication with the processor and the at least one scanner. The communication interface may be in communication with the processor and storage medium for transferring the scanned information. The processor may be programmed to extract contact information from a business document or business card, scan a document and deliver an image of the document to the contact information from the business document or business card. The contact information may include at least one of an email address, a fax number or a postal address. The scanner may scan a business document or a business card in addition to scanning the information to be transferred. The communication interface in communication with the processor and storage medium may include emailing the information to a recipient.

Another embodiment includes a method for sending material to a recipient identified by a business document. The method includes scanning a business document. Contact information of a recipient may then be parsed from the business document. Material to be transferred may be provided and the material then transferred to the recipient. The business document may include a business card, a resume, an application form, or any other document containing contact information. The contact information may include at least one of an email address, a fax number or a postal address. The material may be transferred to the recipient upon removal of the business document or business card from a scanner. The material may then be transferred by email to an email address parsed from the business document or business card. The material transferred to the recipient may be from a multifunction device.

BRIEF DESCRIPTION OF THE DRAWINGS

Aspects, features, benefits and advantages of the embodiments of the present invention will be apparent with regard to the following description, appended claims and accompanying drawings where:

DETAILED DESCRIPTION

Before the present methods, systems and materials are described, it is to be understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Thus, for example, reference to a "document" is a reference to one or more documents and equivalents thereof known to those skilled in the art, and so forth. The term "document", "materials" and "information" will be used interchangeably herein. Unless defined otherwise, all technical and scientific terms used herein have the same meanings as commonly understood by one of ordinary skill in the art. Although any methods, materials, and devices similar or equivalent to those described herein can be used in the practice or testing of embodiments of the invention, the preferred methods, materials, and devices are now described.

The disclosed embodiments generally relate to methods and systems for sending information to a recipient. In particular, the method and system relate to sending a scanned document automatically to a recipient from contact information obtained from a business document, for example, from the recipient's business card. In various embodiments described herein, the method and system may describe the use of a multifunction device. The multifunction device may include any combination of devices selected from the group, for example, that includes a printer, a scanner, a copier, or a fax machine. A multifunction device generally includes a printer/scanner/copier combination device. While the disclosure herein will be described in terms of a multifunction device, a stand alone device or unit for example, a scanner, may be interchangeably used. Additionally, it will be understood by one skilled in the art that the multifunction device or stand alone device may be connected to a network server or may be connected to a local network of devices.

Figure 1:
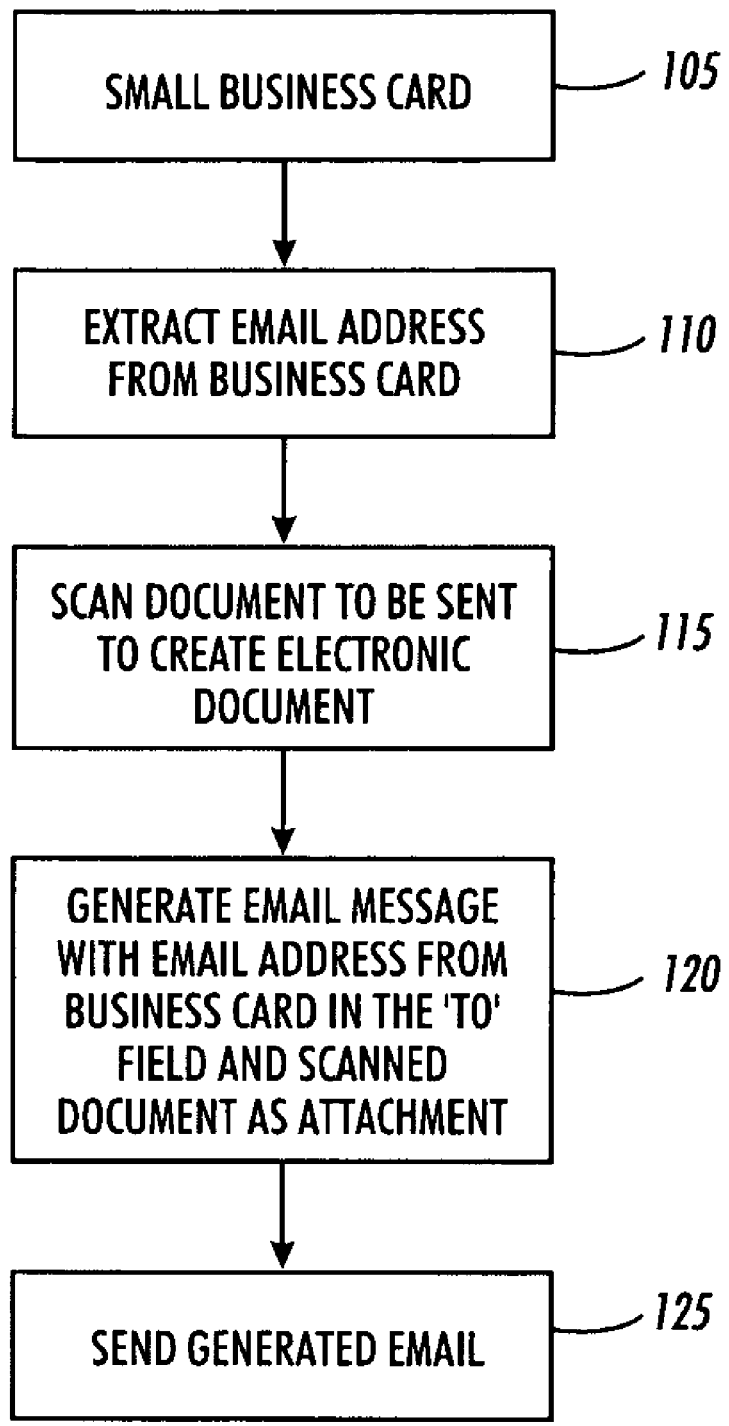
FIG. 1 depicts a flow diagram for an exemplary method of sending material to a recipient according to an embodiment of the disclosure.

FIG. 1 depicts a flow diagram for an exemplary method of sending information or material to a recipient. Initially, a user may scan a business card 105. A variety of units may be utilized for the user to scan the business card. The unit for scanning the business card may be an electronic business card reader having a digital scanner. The electronic business card reader may be a separate unit that is connected to a multifunction device. Alternatively, the electronic business card reader may be integrated in a multifunction device. The business card scanner may also include a document feeder. In use, the unit scans one or more business cards that have been placed on a platen of the digital scanner of the electronic business card reader in preparation for digital scanning. The platen, with the business card thereon, is then scanned to generate a digital bitmap representing the scanned platen area. In other embodiments, the business card reader may include a platen and a controller that controls the operation of the reader. The details of the inner working of scanning devices are well known and examples are described in U.S. Patent Publication No. US2004/0234311; U.S. Patent Publication No. US2004/0169873; and U.S. Pat. No. 6,744,536 all of which are herein incorporated by reference.

Next, an email address is parsed from the business card 110. As further described in U.S. patent application Ser. No. 10/970,930, filed Oct. 22, 2004 entitled "System and Method for Identifying and Labeling Fields of Text Associated With Scanned Business Documents", the disclosure of which is incorporated herein in its entirety, the email address is parsed from the digital bitmap generated from scanning the business card in step 105. Other methods for parsing information are described in U.S. Publication No. 2004/0096102 entitled "Methodology for Scanned Color Document Segmentations"; U.S. Publication No. 2003/0161534 entitled "Feature Recognition Using Loose Gray Scale Template Matching"; and U.S. Publication No. 2003/0063097 entitled "Detection and Segmentation of Sweeps in Color Graphic Images", all of which are herein incorporated by reference. The digital bitmap may be sent to a network server, assuming that the digital scanner is a network citizen. The digital scanner may be part of the multifunction device as described above, that has a processor capable of performing the various functions to convert the bitmap to usable text data and to parse out this text data into coherent and meaningful fields.

The process of parsing text from the digital bitmap may include a business card segmentation process as described in U.S. patent application Ser. No. 10/970,930. Initially, the business card on the platen is located. If there is more than one business card on the platen, the boundaries of the multiple business cards are generally identified. Once all the business cards are located, a structured image, or similar digital document format representing the image may be created.

A more detailed discussion of a business card segmentation process is set forth in U.S. Pat. No. 6,704,456, entitled "Automatic Image Segmentation in the Presence of Severe Background Bleeding." The entire content of U.S. Pat. No. 6,704,456 is hereby incorporated by reference. Another discussion of a segmentation process that may be readily used is set forth in U.S. Pat. No. 6,738,154, entitled "Locating the Position and Orientation of Multiple Objects with a Smart Platen." The entire content of U.S. Pat. No. 6,738,154 is hereby incorporated by reference.

The business card digital bitmap may be processed by an optical character recognition process. The optical character recognition process may be any conventional optical character recognition process used by one skilled in the art such as that described in U.S. Pat. No. 6,396,951. The optical character recognition process performed converts each business card digital bitmap into a business card record of text data. A plurality of fields of text data with labels to identify the nature of the text data within the fields, the labels being, for example, name, title, organization name, address, phone number, etc. are extracted from the business cards. The labeled fields of text data may then be converted into a text file that may readily be used by various business contact management applications to import the desired business information in a useable format. For example, the text file generated can be imported into a conventional e-mail application or an electronic address book. The text file also may be electronically transferred to a database residing on the network on a multifunction device.

In the next step of the disclosure, the document to be sent to the recipient is scanned to create an electronic document 115. The document to be scanned may be scanned on a unit that is different from the unit which scanned the business card, or it may be scanned using the same scanning unit as the business card scanner. In an embodiment, the document to be scanned may be placed on the platen or automatic document feeder of a multifunction device separate from the business card scanner. Once the entire document has been scanned, an electronic version of the document may be created. In another embodiment, upon scanning the business card, the business card may then be removed from the scanner and the document then scanned to generate an electronic version of the document.

Next, the multifunction device generates an email message 120. The email message is generated with the email address extracted from the business card in the "to" field of the message and the electronic document from step 115 is attached in the body of the email message. The email message may include an identifier in the "from" field which identifies the sender of the email message. The identifier may identify the machine from where the email message was sent from. Optionally, if the user wishes to be identified by his or her email address in the "from" field, the user may insert his or her business card in the scanner prior to inserting and scanning the business card of the recipient. Text in the body of the email message may be included if so desired. The generated email message is then emailed to a recipient 125.

In use, a business card in the reader or scanner may signal both the intent to scan as well as the destination of the scan. For example, when a user desires to transfer a document to a recipient, he or she may place the business card in the business card reader or scanner for the email address to be extracted therefrom. The user may then place the document to be transferred onto an additional platen or document feeder to be scanned. If there are multiple documents, all of the documents scanned may be bundled into a single bundle of images while the business card is on the business card platen. Upon completion of scanning the documents, the user may simply remove the business card from the reader and scanner, thereby signaling to the multifunction device to generate the email with the document attached electronically to the email address extracted from the business card and then send an email.

Alternatively, a single scanner may be utilized. In this embodiment, the user may scan the business card, remove the business card and then scan the documents to be transferred. Upon completion of scanning the documents, the multifunction device may automatically generate and send the documents in an email to the email address extracted from the business card. Optionally, the multifunction device may ask or require the user to verify that the information is correct, to proceed with sending the email, or even ask for additional email addresses.

Additional steps may be utilized in the method described herein. For example, prior to inserting the business card in the reader, the user may select a button on the multifunction device indicating that the user wishes to send a document via email to an email address extracted from the business card. Alternatively, the multifunction device may ask that the user confirms the verification of the steps, i.e. are there any additional business cards to be scanned? have all documents to be transferred scanned, is the email address correct?, etc .... The multifunction device may also have an interactive communication process with the user, where the user answers a series of 'yes' or 'no' questions. In other embodiments, the multifunction device may have buttons that facilitate the process with the multifunction device controlling the process. For example, the buttons may say "scan business card", "extract email address", "scan document" "generate email", "send email", or the like. This provides a "green button" approach to scan to email. Optionally, instructions may be printed on the device. For example, the instructions may state, "To scan to email, insert business card, place document in feeder and press start."

In alternative embodiments, the recipient's contact information to which a document may be sent is not limited to information extracted from the business card. Contact information may be extracted from other sources of materials. For example, contact information may be extracted from business documents including resumes, envelopes, membership forms, applications and the like. These business documents may then be scanned and documents to be transferred sent to the email addresses, for example, extracted therefrom.

In another embodiment, if the user desires to email a document to more than one recipient, multiple business cards may be scanned. Multiple business cards may be placed on the platen of a digital scanner from which the email addresses may be extracted from simultaneously. Alternatively, multiple business cards may be scanned individually one-at-a-time to extract the email addresses of the recipients. The email addresses extracted may then be used to form a distribution list, where a scanned document may be emailed to a number of recipients by scanning the document only once. In a default configuration, as long as the business cards are added to the business card scanner, the multifunction device continues to add the cards to a distribution list. Upon scanning the document and pressing a "scan" button, the device emails the scanned document to all of the email addresses captured from the business cards. When the distribution list is formed, the distribution list may be stored on the multifunction device for use at a later date. Additionally, email addresses may be added to an existing distribution list previously stored on the multifunction device.

In other embodiments, an email address may be extracted from a business card to send an email directly from the multifunction device. Optionally, the email address may be extracted from a business card to send email from a server attached to a multifunction device. Additionally, an email address may be extracted from the business card and information that may be contained in a repository may be routed to the recipient's email address. In another embodiment, personal data from the scanned business card may be utilized to look up an email address, for example, in an existing address book.

Contact information parsed from a business card or a business document described above may include any type of information identifying the location of a recipient to which a document may be sent. For example, while the disclosure herein has been described in terms of sending a scanned document to a recipient's email address, other modes of data transfer may be utilized. Additional contact information parsed from a business card may include, for example, a fax number or a postal address for the recipient.

In an embodiment, a fax number may be extracted from the business card, and a document may be faxed directly to the recipient's fax number from the multifunction device. In operation, a business card may initially be scanned. The fax number may then be extracted from the business card using optical character recognition such as those described above. A document to be transferred to a recipient may then be fed through a fax machine or a multifunction device. Upon feeding the document through the device, the document may automatically be sent to the fax number extracted from the business card. Optionally, a distribution list of fax numbers may be generated by scanning a plurality of business cards and extracting the fax number from each business card. The document to be transferred may then be fed through the multifunction device and automatically transmitted to the plurality of fax numbers.

In another embodiment, a postal address, for example, a business address may be extracted from the business card or business document upon scanning of the business card. The multifunction device may then produce a preaddressed envelope with the extracted business address. Optionally, as described above, a distribution list of business addresses may be created by scanning a plurality of business cards and extracting the business addresses therefrom. The multifunction device may then produce a plurality of addressed envelopes corresponding to the extracted business addresses. Alternatively it may produce address labels which may then be adhered to the envelopes.

Figure 2:
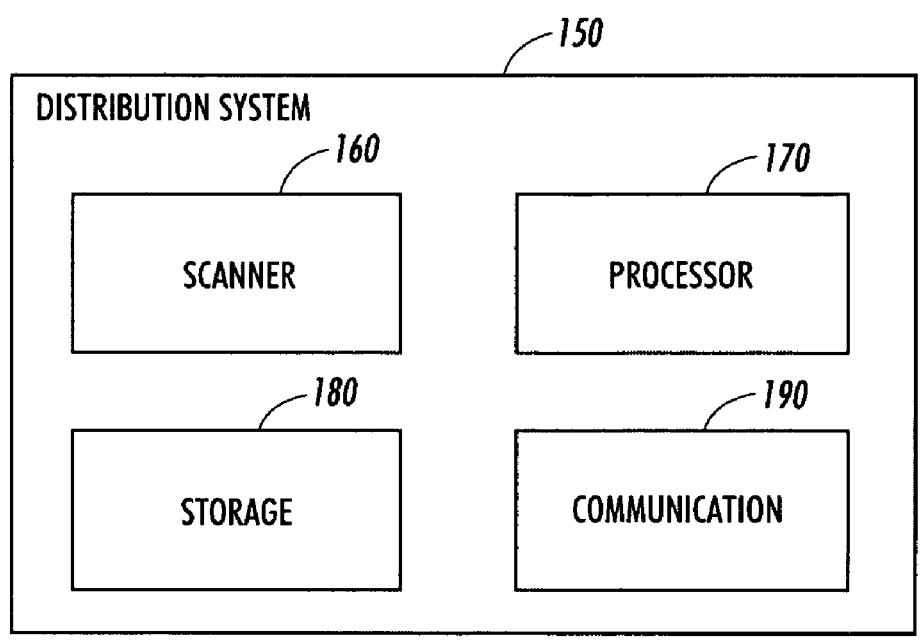
FIG. 2 depicts an exemplary system for distributing documents according to an embodiment of the disclosure.

FIG. 2 depicts an exemplary system for distributing documents according to an embodiment. As illustrated in FIG. 2, a distribution system 150 may include a scanner 160, a processor 170, a storage medium 180, and a communication interface 190.

The scanner 160 may be utilized for scanning a business document and/or a document to be transferred. In an embodiment, the scanner 160 may be a single unit that scans both the business document and the document to be transferred. Alternatively, in another embodiment, there may be two scanners, one for scanning the business document and an additional scanner for scanning the document to be transferred.

The processor 170 may provide a mechanism for parsing the recipient's contact information from the business document. For example, the processor identifies the email address, fax number, or postal address for the recipient.

The storage medium 180 may store the document to be transferred. The storage medium 180 may also store the contact information of the recipient. For example, after parsing an email address from a business card, the email address may be stored in the storage medium 180. Optionally, after scanning the document to be transferred to a recipient, the scanned document may be stored in the storage medium. The storage medium 180 may include a multifunction device, a copier, a printer and the like.

The communication interface 190 may be utilized to generate an email and send the email to a recipient with the scanned document as an attachment. The communication interface 190 may be in communication with the scanner 160, the processor 170 and the storage medium 180. For example, the communication interface 190 may place the parsed email address in the "to" field of the email message and include the scanned document as an attachment to the email message. In an embodiment, the communication interface 190 may be connected to a network server. Alternate embodiments include the communication interface to be connected to a stand alone device.

An embedded system may optionally be used to perform one, some or all of the operations of the methods described above. Likewise, a multiprocessor system may optionally be used to perform one, some or all of the methods described herein.

The Examples below are merely representative of the work that contributes to the teaching of the present disclosure and are not considered to be restrictive of the disclosure.

EXAMPLES

Example 1

The user places a business card in a business card reader. The business card reader senses the presence of a card and scans the card. The scanned image of the business card is sent to a server along with an identifier that indicates the multifunction device/business card scanner and where the information originated from. The user then inserts the document to be scanned into the automatic document feeder of the multifunction device and presses the scan button. The multifunction device scans the document and sends the scanned document to the server. The server then extracts the email address from the business card. The server constructs an email with the "to" field filled with the extracted email address from the card and having an attachment containing the scanned document.

Example 2

A multifunction device may be attached to a network. At the multifunction device, the user selects the scan to business card workflow. The user places the business card containing the destination address on the platen and selects the "start" button. The business card is scanned and the email address is extracted. Once the scan is completed, the user removes the business card from the platen and places the document to be sent to the extracted email address into the automatic document feeder or on the platen and presses "start". The document is scanned and then sent to the appropriate destination address.

This example implements the scan to business card workflow without adding any additional hardware costs to a multifunction device. The workflow processing may either be performed on the multifunction device or the scanned business card and the document may be sent to an offbox document server where it may be processed. In this example, the user indicates how the scanning is to proceed. The user must first select the workflow at the user interface, then scan the business card and the document.

Embodiments described herein may provide numerous advantages. For example, by offering a business card to a colleague, the ability for that colleague to send scanned documents can easily occur. In addition a person can send emails to himself or herself without preparing a coversheet or requesting a template, with the person's business card being a sufficient identifier of an email address.

Also, as described in Example 2, dealing with multiple modes of transmission is easier to handle. Since the user chooses the "scan to business card email address" workflow at the user interface, the machine may change the user interface to present the options pertinent to this workflow. Email addresses and other types of addresses from forms other than business cards can be extracted. Any form that can be placed on the main platen may be used as the source of an email address. Distribution lists can easily be created by scanning forms with multiple email addresses. The multifunction device would add all unique email addresses found on the form to a single distribution list to which it sends the document. For example, a department organizational chart that contains email addresses may be scanned, processed for email addresses and scans sent to all email addresses found to send a scanned document to all people in a department.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for distributing a document by email, comprising:
    scanning a business document;
    extracting an email address from the business document;
    scanning a document to produce an electronic document;
    removing the business document from a scanner to initiate emailing of the electronic document; and
    automatically emailing the electronic document to the email address extracted from the business document.

2. The method according to claim 1, wherein the step of extracting an email address from the business document further comprises utilizing optical character recognition technology to obtain the email address.

3. The method according to claim 1, wherein multiple business documents are scanned to form a distribution list comprising a plurality of email addresses.

4. The method according to claim 3, wherein the electronic document is distributed to the distribution list.

5. The method according to claim 1, wherein a user is not required to input an email address.

6. The method according to claim 1, wherein the step of emailing the electronic document to the email address extracted from the business document occurs from a multifunction device.

7. The method according to claim 1, wherein the business document is scanned in a scanner in communication with a multifunction device.

8. The method according to claim 1, further comprising the step of inserting the business document in a scanner to initiate scanning of the business document.

9. The method according to claim 1, wherein the business document comprises a business card, a resume or, an application form, or any document containing contact information.

10. A method for sending material to a recipient identified by a business document, comprising:
    scanning a business document;
    parsing contact information of a recipient from the business document;
    providing material to be transferred; and
    transferring the material to the recipient, wherein the transferring occurs when the business document is removed from a scanner.

11. The method according to claim 10, wherein the business document comprises a business card, a resume or, an application form, or any document containing contact information.

12. The method according to claim 10, wherein the contact information comprises at least one of an email address, a fax number or a postal address.

13. The method according to claim 10, further comprises transferring the material by email to an email address parsed from the business document.

14. The method according to claim 10, wherein the material transferred to the recipient's email address is from a multifunction device.

* * * * *